(12) United States Patent
Wu et al.

(10) Patent No.: US 12,422,722 B2
(45) Date of Patent: Sep. 23, 2025

(54) DISPLAY PANEL AND DISPLAY DEVICE

(71) Applicants: Beijing BOE Optoelectronics Technology Co., Ltd., Beijing (CN); BOE Technology Group Co., Ltd., Beijing (CN)

(72) Inventors: Xiaojuan Wu, Beijing (CN); Cuiyu Chen, Beijing (CN); Jiaxing Wang, Beijing (CN); Feng Liu, Beijing (CN); Dawei Feng, Beijing (CN); Jinshuai Duan, Beijing (CN); Zhiqiang Yu, Beijing (CN); Danxing Hou, Beijing (CN); Ning Wang, Beijing (CN); Yichi Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/278,414

(22) PCT Filed: Nov. 28, 2022

(86) PCT No.: PCT/CN2022/134623
§ 371 (c)(1),
(2) Date: Aug. 23, 2023

(87) PCT Pub. No.: WO2024/113079
PCT Pub. Date: Jun. 6, 2024

(65) Prior Publication Data
US 2025/0013112 A1   Jan. 9, 2025

(51) Int. Cl.
G02F 1/137    (2006.01)
G02F 1/1335   (2006.01)
G02F 1/1337   (2006.01)

(52) U.S. Cl.
CPC .... *G02F 1/13718* (2013.01); *G02F 1/133553* (2013.01); *G02F 1/133562* (2021.01); *G02F 1/133618* (2021.01); *G02F 1/1337* (2013.01)

(58) Field of Classification Search
CPC .................................................... G02F 1/13718
See application file for complete search history.

(56) References Cited

U.S. PATENT DOCUMENTS

| | | |
|---|---|---|
| 2001/0040717 A1 | 11/2001 | Minoura et al. |
| 2010/0134733 A1 | 6/2010 | Watanabe et al. |
| 2013/0208220 A1 | 8/2013 | Gu et al. |

FOREIGN PATENT DOCUMENTS

| | | |
|---|---|---|
| CN | 2814453 Y | 9/2006 |
| CN | 101772726 A | 7/2010 |

(Continued)

*Primary Examiner* — Paisley L Wilson
(74) *Attorney, Agent, or Firm* — Ling Wu; Stephen Yang; Ling and Yang Intellectual Property

(57) ABSTRACT

A display panel including: a first substrate and a second substrate disposed oppositely and a liquid crystal layer disposed between the first substrate and the second substrate; a material of the liquid crystal layer includes a cholesteric liquid crystal; the display panel further includes: a microstructure optical film layer located on a side of the second substrate facing away from the first substrate; incident light is incident from a side of the microstructure optical film layer, reflected by the cholesteric liquid crystal, and then emerged from the microstructure optical film layer; the microstructure optical film layer includes multiple wedge structures; at least part of the wedge structures have different angles and sizes, so that light emerged from side view angles with different emergent angles are adjusted to a center view angle.

16 Claims, 5 Drawing Sheets

(56) References Cited

FOREIGN PATENT DOCUMENTS

| CN | 102411225 A | 4/2012 | |
|---|---|---|---|
| CN | 102629063 A | 8/2012 | |
| CN | 110109310 A | 8/2019 | |
| CN | 111025720 A | 4/2020 | |
| CN | 108562964 B | 9/2021 | |
| WO | WO-2013156112 A1 * | 10/2013 | ....... G02F 1/133553 |

* cited by examiner

DISPLAY PANEL AND DISPLAY DEVICE

CROSS-REFERENCE TO RELATED APPLICATIONS

The present application is a U.S. National Phase Entry of International Application PCT/CN2022/134623 having an international filing date of Nov. 28, 2022, and entitled "Display Panel and Display Device", the contents of which should be regarded as being incorporated herein by reference.

TECHNICAL FIELD

The present disclosure pertains to the field of display technologies, and particularly to a display panel and a display device.

BACKGROUND

With the continuous development of Internet technologies, display electronic products have been fully applied to various fields. In conventional LCD products with backlight module, damage of blue light to human eyes has aroused widespread concern. Eliminating the damage of blue light to human eyes has become a strong demand, especially, the pandemic of coronavirus disease (COVID-19) in recent years further promotes this demand.

Total reflection display technologies use ambient light as a light source, which can truly eliminate blue light and achieve an effect of eye protection. It mainly adopts color total reflection liquid crystal technology and color electrophoresis display technology (i.e. electronic paper). Among them, the color total reflection liquid crystal technology needs color filter to achieve color display, and also need polarizer, which have low reflectivity, high power consumption, high cost, invisibility in sunlight and poor actual experience. The color electrophoretic display technology also needs color filter, which have low reflectivity. Moreover, due to divergence of ambient light, most of the ambient light is reflected and emerged from a side view angle, which will not enter from a central view angle of a user, resulting in poor front display effect and seriously affecting the user experience.

SUMMARY

The present disclosure aims at solving at least one of technical problems existing in the prior art, and provides a display panel and a display device.

In a first aspect, an embodiment of the present disclosure provides a display panel, including: a first substrate and a second substrate disposed oppositely and a liquid crystal layer disposed between the first substrate and the second substrate; a material of the liquid crystal layer includes: cholesteric liquid crystal; the display panel further includes: a microstructure optical film layer located on a side of the second substrate facing away from the first substrate; incident light is incident from a side of the microstructure optical film layer, reflected by the cholesteric liquid crystal, and then emerged from the microstructure optical film layer; and the microstructure optical film layer includes multiple wedge structures; at least part of the wedge structures have different angles and sizes, so that light emerged from side view angles and with different emergent angles are adjusted to be emerged from a center view angle.

In some examples, each wedge structure includes an inclined substructure and a horizontal substructure; an included angle between an inclined surface of the inclined substructure and a horizontal plane of the horizontal substructure is greater than 90 degrees and less than 180 degrees.

In some examples, $$\theta = \arctan\left[\frac{\sin\theta_{Incidence} - n_{film}\sin\left(\arcsin\left(\frac{1}{n_{film}}\sin\theta_{Emergence}\right)\right)}{n_{film}\cos\left(\arcsin\left(\frac{1}{n_{film}}\sin\theta_{Emergence}\right)\right) - \cos\theta_{Incidence}}\right]$$

$\theta$ is a complementary angle of the included angle between the inclined surface of the inclined substructure and the horizontal plane of the horizontal structure, $\theta_{Incidence}$ is an included angle between the incident light and a normal line of the display panel, $\theta_{Emergence}$ is an included angle between emergent light and the normal line of the display panel, $n_{film}$ is a refractive index of the wedge structure.

In some examples, $$w_1 = \frac{1}{2 - \tan\theta\tan\theta_1}\frac{P}{n}$$

$$w_2 = \left(1 - \frac{1}{2 - \tan\theta\tan\theta_1}\right)\frac{P}{n} = \left(1 - \frac{1}{2 - \tan\theta\tan\left[\arcsin\left(\frac{1}{n_{film}}\sin\theta_{Emergence}\right)\right]}\right)\frac{P}{n}$$

$$d_1 = w_1\tan\theta$$

$$d_2 = \frac{w_2 - 2t\tan\theta_2 - d\tan\theta_3}{2\tan\theta_1}$$

$\theta$ is a complementary angle of the included angle between the inclined surface of the inclined substructure and the horizontal plane of the horizontal substructure, $w_1$ is a width of the inclined substructure, $w_2$ is a width of the horizontal substructure, $d_1$ is a height by which the inclined substructure is higher than the horizontal substructure, $d_2$ is a height of the horizontal substructure, $\theta_1$ is an included angle between the normal line of the display panel and the refracted light after the incident light passes through the inclined substructure, $\theta_2$ is an included angle between the refracted incident light and the normal line of the display panel in the second substrate after the incident light is refracted by the wedge structure and the second substrate, $\theta_3$ is an included angle between the refracted incident light and the normal line of the display panel after the incident light is refracted by the wedge structure, the second substrate, and the liquid crystal layer, P is a width of a pixel area, n is a number of wedge structures in each pixel area, t is a thickness of the second substrate, and d is a thickness of the liquid crystal layer.

In some examples, in a same wedge structure, the incident light is incident from the inclined substructure and emerged from the horizontal substructure.

In some examples, the complementary angle of the included angle between the inclined surface of the inclined substructure and the horizontal plane of the horizontal structure gradually increases as an included angle between the incident light and the normal line of the display panel gradually decreases in a direction from an edge of the display panel toward a center of the display panel.

In some examples, in a same pixel area, a quantity of the inclined substructures and is the same as a quantity of the horizontal substructures and both are integer numbers.

In some examples, all of the wedge structures are arranged in concentric circles centered on a center of the display panel.

In some examples, a difference between refractive indices of any two of the microstructure optical film layer, the second substrate, and the liquid crystal layer is less than a preset value.

In some examples, the first substrate includes a first base substrate, multiple pixel electrodes, a drive circuit layer, and a first alignment layer;
the multiple pixel electrodes are located on the first base substrate;
the drive circuit layer is located on a side of the pixel electrodes close to the first base substrate;
the first alignment layer is located on a side of the pixel electrodes facing away from the first base substrate.

In some examples, the second substrate includes a second base substrate, a common electrode layer, and a second alignment layer;
the common electrode layer is located on a side of the second base substrate close to the first base substrate; and
the second alignment layer is located on a side of the common electrode layer facing away from the second base substrate.

In some examples, an alignment direction of the first alignment layer and an alignment direction of the second alignment layer are inversely parallel to each other.

In some examples, the display panel further includes supports between the first alignment layer and the second alignment layer; and
cholesteric liquid crystal is filled between adjacent supports.

In a second aspect, an embodiment of the present disclosure provides a display device, wherein the display device includes the display panel provided as described above.

DETAILED DESCRIPTION

In order to make those skilled in the art better understand technical solutions of the present disclosure, the present disclosure is described in further detail below with reference to accompanying drawings and specific implementations.

Unless otherwise defined, technical terms or scientific terms used in the present disclosure should have the meanings as commonly understood by those of ordinary skills in the art to which the present disclosure pertains. The "first", "second" and similar terms used in the present disclosure do not indicate any order, quantity, or importance, but are used only for distinguishing different components. Similarly, similar wordings such as "a", "an" or "the" do not denote a limitation on quantity, but rather denote the presence of at least one. "Include", "contain", or similar wording means that elements or objects appearing before the wording cover elements or objects listed after the wording and their equivalents, but do not exclude other elements or objects. "Connect", "join", or similar wording is not limited to a physical or mechanical connection, but may include an electrical connection, whether direct or indirect. "Upper", "lower", "left", "right", etc., are used to represent relative positional relations, and when an absolute position of a described object is changed, the relative positional relation may also be correspondingly changed.

Figure 1:
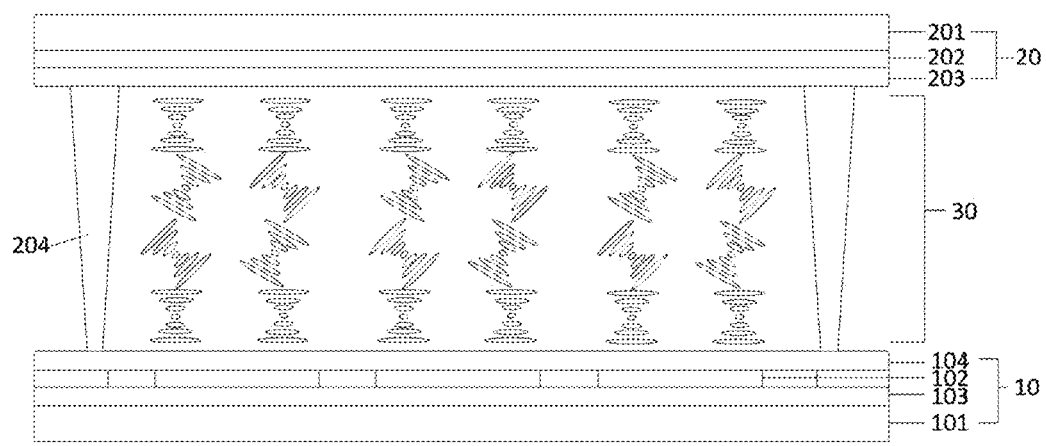
FIG. 1 is a schematic diagram of a structure of a display panel according to an embodiment of the present disclosure.

In a first aspect, an embodiment of the present disclosure provides a display panel. FIG. 1 is a schematic diagram of a structure of a display panel according to an embodiment of the present disclosure. As shown in FIG. 1, the display panel includes: a first substrate 10 and a second substrate 20 disposed oppositely and a liquid crystal layer 30 located between the first substrate 10 and the second substrate 20. A material of the liquid crystal layer 30 includes a cholesteric liquid crystal.

Figure 2:
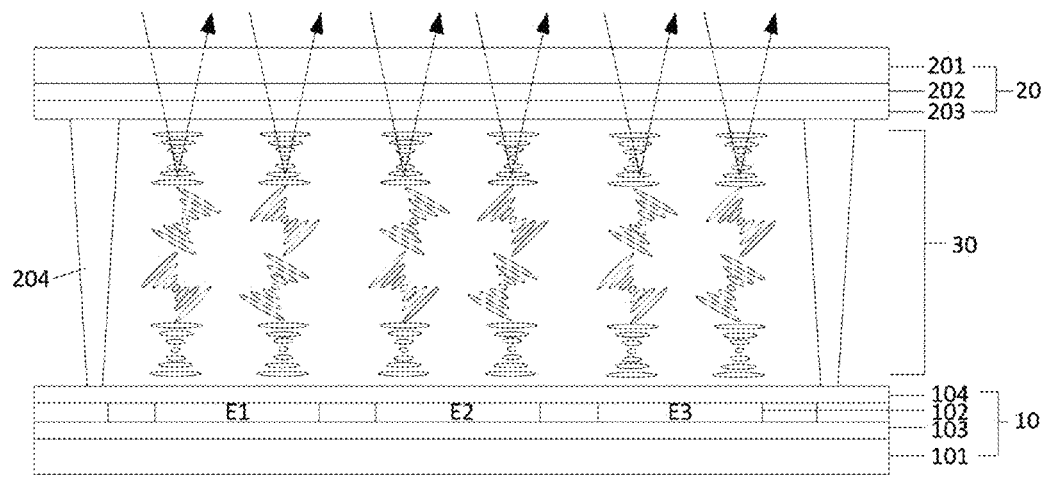
FIG. 2 is a schematic diagram of a light reflection principle of the display panel shown in FIG. 1.

FIG. 2 is a schematic diagram of a light reflection principle of the display panel shown in FIG. 1. As shown in FIG. 2, when no drive voltage is applied between the first substrate 10 and the second substrate 20, a conical helix cholesteric liquid crystal presents a focal cone texture and can scatter an incident light. When a drive voltage is applied between the first substrate 10 and the second substrate 20, the conical helix cholesteric liquid crystal is changed from a focal cone texture to a conical helix texture, which can reflect visible light matched with its pitch in this case. Applying different drive voltages can deflect the cholesteric liquid crystal in different areas by different angles, so that visible light of different colors can be reflected, thereby realizing color display.

Figure 3:
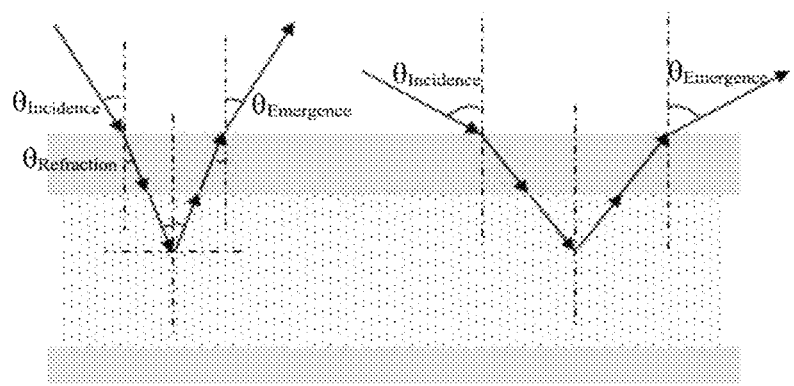
FIG. 3 is a diagram of a reflection light path with a preferred direction in the display panel shown in FIG. 1.

When light is obliquely incident, the cholesteric liquid crystal, due to its special conical helix structure, has the best reflectivity and color in a direction forming specular reflection with the angle of incident light, while an optical performance of reflected light from other angles is inferior to that of the specular reflection angle. FIG. 3 is a diagram of a reflection light path with a preferred direction in the display panel shown in FIG. 1, $\theta_{Incidence}$ is an included angle between an incident light and a normal line of the display panel, $\theta_{Refraction}$ is an included angle between the normal line of the display panel and refracted light after the incident light passes through the second substrate, $\theta_{Emergence}$ is an included angle between an emergent light and the normal line of the display panel. If the refractive indices of the liquid crystal layer 30 and the second substrate 20 are similar or equal, the light enters the liquid crystal layer 30 with an angle of $\theta_{Refraction}$, and then emerges again through the second substrate 20, each of the emergent light and the incident light forms a reverse light path of the other, that is, $\theta_{Incidence}$ is equal to $\theta_{Emergence}$. In this way, the cholesteric liquid crystal in the liquid crystal layer 30 can achieve total reflection display with the help of the ambient light.

The display panel according to the embodiment of the present disclosure can achieve total reflection color display without using structures such as a color filter, and a polarizer, thus avoiding the damage of blue light to human eyes. At the same time, the display panel does not need to use devices, such as color filter or polarizer, which can improve a reflection efficiency of light, improve a display effect of the display panel, and reduce a thickness of the display panel, which is beneficial to lightness and thinness of the display panel.

In a direct viewing process, the user will block most of the ambient light on the front of the display panel, so that most of the ambient light is incident from sides of the display panel, i.e., it is incident at a certain included angle with respect to the normal line direction of the display panel, and combined with the above fact that an optical effect of the emergent light from the specular reflection is optimal, a display image with the optimal optical effect cannot be observed by human eyes in a central view angle.

Figure 4:
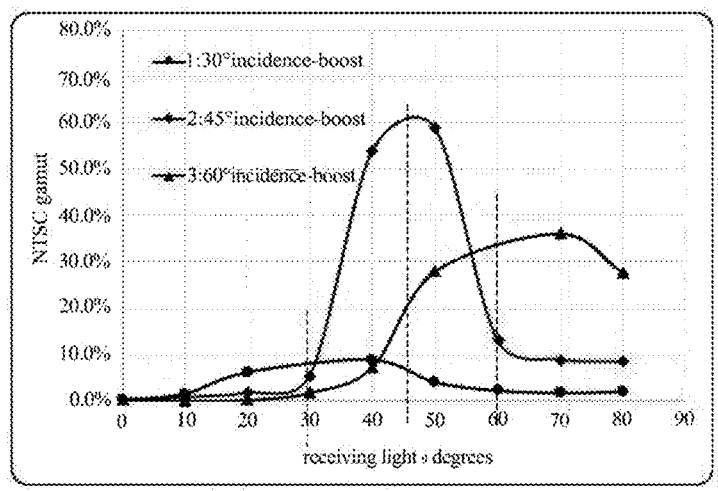
FIG. 4 is a schematic diagram showing a reflected light gamut varying with an incident angle and an emergent angle of the display panel shown in FIG. 1.

FIG. 4 is a schematic diagram showing a reflected light gamut varying with an incident angle and an emergent angle of the display panel shown in FIG. 1. It can be seen from FIG. 4 that when the incident angle of ambient light is 30°, a maximum color gamut can be achieved when the emergent angle is about 30°, that is, human eyes can observe an image with the maximum color gamut and the best optical effect at the specular reflection angle of the incident light. Similarly, when the incident angle of the ambient light is 45°, the maximum color gamut can be achieved when the emergent angle is about 45°, and when the incident angle of the ambient light is 60°, the maximum color gamut can be achieved when the emergent angle is about 60°.

Figure 5:
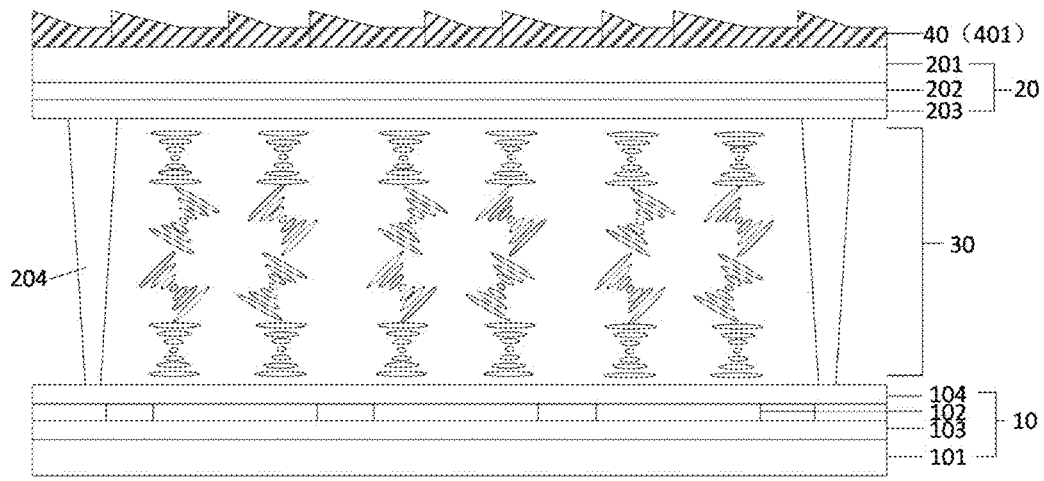
FIG. 5 is a schematic diagram of a structure of another display panel according to an embodiment of the present disclosure.

In order to ensure an optimal optical effect within a range of a central view angle of the display panel, an embodiment of the present disclosure provides another display panel. FIG. 5 is a schematic diagram of a structure of another display panel according to an embodiment of the present disclosure. The display panel shown in FIG. 5 differs from the display panel shown in FIG. 1 in that the display panel shown in FIG. 5 is further provided with a microstructure optical film layer 40 compared with the display panel shown in FIG. 1. The incident light may be incident from a side of the microstructure optical film layer 40, reflected by the cholesteric liquid crystal, and then emerged from the microstructure optical film layer 40. As shown in FIG. 5, the microstructure optical film layer 40 is located on a side of the second substrate 20 facing away from the first substrate 10. The microstructure optical film layer 40 includes multiple wedge structures 401. At least part of the wedge structures 401 have different angles and sizes so that light emerged from side view angles with different emergent angles are adjusted to be emerged from the center view angle.

In the display panel according to the embodiment of the present disclosure, the wedge structures 401 can refract the incident light, and since each wedge structure 401 has an inclined surface intersecting with a horizontal plane, the wedge structures 401 can adjust a propagation direction of the light during a propagation process, so that the light is emitted from the central view angle. At the same time, the angles and sizes of the multiple wedge structures 401 are different, so that light emerged from side view angles with different emergent angles can be adjusted to be emerged from the center view angle, and intensity of light emerged from the center view angle can be improved. In this way, optical characteristics of the center view angle can be improved, thus achieving a display effect with high color gamut and high reflection efficiency and improving the user experience.

It should be noted that the center view angle may be a view angle where an included angle between a sight line of view user and the normal line of the display panel is less than 60 degrees, and the side view angle may be a view angle where an included angle between a sight line of user and the normal line of the display panel is greater than or equal to 60 degrees. Of course, ranges of the center view angle and the side view angles can also be adjusted according to actual needs, which are not limited herein.

Figure 6:
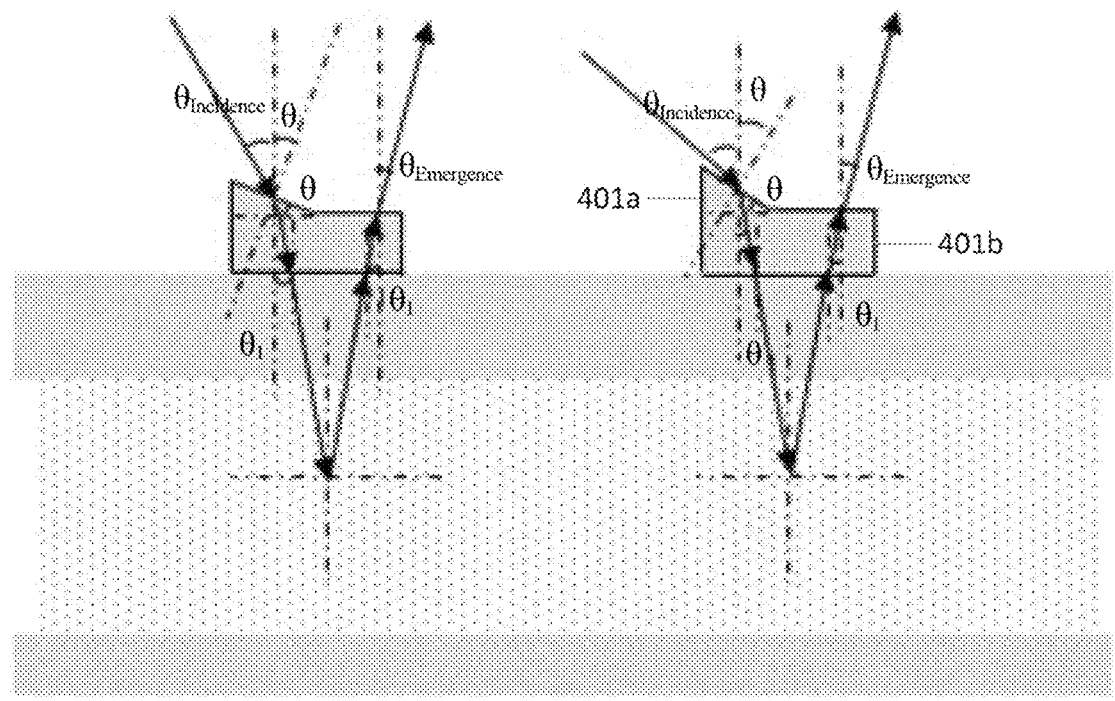
FIG. 6 is a schematic diagram of a structure of a wedge structure in the display panel shown in FIG. 5.

FIG. 6 is a schematic diagram of a structure of a wedge structure in the display panel shown in FIG. 5. As shown in FIG. 6 the wedge structure includes an inclined substructure 401a and a horizontal substructure 401b. An included angle between an inclined surface of the inclined substructure 401a and a horizontal plane of the horizontal substructure 401b is greater than 90 degrees and less than 180 degrees.

The included angle between the inclined surface of the inclined substructure 401a and the horizontal plane of the horizontal substructure 401b is obtuse, so that the incident light irradiates the inclined surface of the inclined substructure 401a and is emerged from the horizontal plane of the horizontal structure 401b, thereby improving a utilization rate of the light. When the incident light irradiates the inclined surface of the inclined substructure 401a and is emerged from the horizontal plane of the horizontal structure 401b, a propagation direction of the light can be changed due to the included angle between the incident surface and the emergent surface, thus breaking the original propagation path of the specular reflection and adjusting the emergent light to the central view angle. By setting different angles between the incident surface and the emergent surface in each wedge structure 401, light with different incident angles can all be adjusted to the central view angle, and the intensity of the emergent light from the central view angle can be improved.

Taking the wedge structure shown in FIG. 6 as an example, the included angle θ as the complementary angle of the included angle between the inclined surface of the inclined substructure 401a and the horizontal plane of the horizontal structure 401b, can be set according to the angle of incident light and the angle of required emergent light. The specific calculation process is as follows, $$n_{Air}\sin(\theta_{Incidence} + \theta) = n_{film}\sin(\theta + \theta_1) \Rightarrow \tan\theta =$$

$$\frac{n_{Air}\sin\theta_{Incidence} - n_{film}\sin\theta_1}{n_{film}\cos\theta_1 - n_{Air}\cos\theta_{Incidence}} = \frac{\sin\theta_{Incidence} - n_{film}\sin\theta_1}{n_{film}\cos\theta_1 - \cos\theta_{Incidence}}$$

$$n_{film}\sin\theta_1 = n_{Air}\sin\theta_{Emergence} \Rightarrow \theta_1 =$$

-continued $$\arcsin\left(\frac{n_{Air}}{n_{film}}\sin\theta_{Emergence}\right) = \arcsin\left(\frac{1}{n_{film}}\sin\theta_{Emergence}\right) \Rightarrow \tan\theta =$$

$$\frac{\sin\theta_{Incidence} - n_{film}\sin\left(\arcsin\left(\frac{1}{n_{film}}\sin\theta_{Emergence}\right)\right)}{n_{film}\cos\left(\arcsin\left(\frac{1}{n_{film}}\sin\theta_{Emergence}\right)\right) - \cos\theta_{Incidence}} \Rightarrow \theta =$$

$$\arcsin\left[\frac{\sin\theta_{Incidence} - n_{film}\sin\left(\arcsin\left(\frac{1}{n_{film}}\sin\theta_{Emergence}\right)\right)}{n_{film}\cos\left(\arcsin\left(\frac{1}{n_{film}}\sin\theta_{Emergence}\right)\right) - \cos\theta_{Incidence}}\right]$$

$\theta$ is a complementary angle of the included angle between the inclined surface of the inclined substructure and the horizontal plane of the horizontal structure, $\theta_{Incidence}$ is the angle between the incident light and the normal line of the display panel, $\theta_{Emergence}$ is the angle between the emergent light and the normal line of the display panel, $\theta_1$ is an included angle between the normal line of the display panel and refracted light after the incident light passes through the inclined substructure, $n_{film}$ is a refractive index of the wedge structure, $n_{Air}$ is a refractive index of air.

In order to improve the optical characteristics of the central view angle, it is necessary to increase the quantity of emergent light close to the normal line direction the display panel. Therefore, different wedge structures are designed to adjust angles of the emergent light close to the normal line direction after the light passes through the microstructure optical film layer 40, the second substrate 20 and the liquid crystal layer 30. In practice, if the emergent light is completely parallel to the normal line direction, the optical effect from the front view angle is the best. However, if the light passing through the inclined substructure 401a is perpendicularly incident into the liquid crystal layer 30, an optical path of the reflected light will coincide with an optical path of the incident light based on the specular reflection of the liquid crystal layer 30. After being refracted by the second substrate 20 and the microstructure optical film layer 40 again, the emergent light will enter human eyes in the direction of the incident light, that is, the optical characteristics of the central view angle cannot be enhanced. Therefore, by adjusting $\theta_1$ to a smaller angle in the design, after specular reflection of the liquid crystal layer 30, the reflected light will enter the horizontal substructure 401b, thus entering the human eyes at a smaller angle $\theta_{Emergence}$.

Optionally, if refractive indices of the microstructure optical film layer 40 and the second substrate 20 are the same, the included angle between the incident light entering the liquid crystal layer 30 and the normal line of the display panel is also $\theta_1$, and the included angle between the reflected light and the normal line of the display panel is also $\theta_1$, then $n_{Air} \times \sin\theta_{Emergence} = n_{film} \times \sin\theta_1$.

Assuming that an average refractive index of the second substrate 20 is 1.5, and it is designed that $n_{film}=1.5$, a calculation formula for the angle $\theta$ which is the complementary angle of the included angle between the inclined surface of the inclined substructure 401a and the horizontal plane of the horizontal structure 401b is simplified to:

$$\theta = ar\tan\left(\frac{\sin\theta_{Incidence} - 1.5\sin\theta_1}{1.5\cos\theta_1 - \cos\theta_{Incidence}}\right).$$

Thus, the angle $\theta$ which is the complementary angle of the included angle between the inclined surface of the inclined substructure 401a and the horizontal plane of the horizontal structure 401b can be calculated, which is required for adjusting the incident light at different angles to a set emergent light angle.

Figure 7:
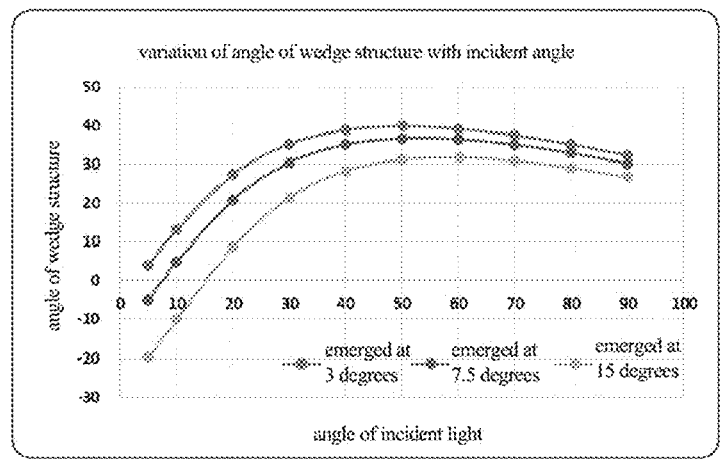
FIG. 7 is a curve of an included angle which is a complementary angle of an included angle between an inclined surface of an inclined substructure and a horizontal plane of a horizontal structure as a function of an incident light angle and an emergent light angle.

FIG. 7 is a curve of an included angle which is a complementary angle of an included angle between an inclined surface of an inclined substructure and a horizontal plane of a horizontal structure as a function of an incident light angle and an emergent light angle. As shown in FIG. 7, for example, when the emergent light is required to emerge at 3° with respect to the normal line of the display panel, i.e., $\theta_{Emergence}=3°$, according to the formula $n_{Air}*\sin\theta_{Emergence}=n_{film}*\sin\theta_1$, and $n_{film}=1.5$, $n_{Air}=1$, it is obtained that $\theta_1=2°$, and then according to $$\theta = ar\tan\left(\frac{\sin\theta_{Emergence} - 1.5\sin\theta_1}{1.5\cos\theta_1 - \cos\theta_{Emergence}}\right),$$

the included angles $\theta$ which are the complementary angles of the included angles between the inclined surfaces of the inclined substructures 401a and the horizontal planes of the horizontal structures 401b corresponding to different incident angles can be calculated.

When the emergent light is required to emerge at 7.5° with respect to the normal line of the display panel, i.e., $\theta_{Emergence}=7.5°$, according to the formula $n_{Air} \times \sin\theta_{Emergence}=n_{film} \times \sin\theta_1$, and $n_{film}=1.5$, $n_{Air}=1$, it is obtained that $\theta_1=5°$, and then the included angles $\theta$ which are complementary angles of included angles between the inclined surfaces of the inclined substructures 401a and the horizontal planes of the horizontal structures 401b corresponding to different incident angles are calculated.

When light is required to emerge at 15° with respect to the normal line of the display, i.e., $\theta_{Emergence}=15°$, according to the formula $n_{Air} \times \sin\theta_{Emergence}=n_{film} \times \sin\theta_1$, and $n_{film}=1.5$, $n_{Air}=1$, it is obtained that $\theta_1=10°$, and then the included angles $\theta$ which are complementary angles of included angles between the inclined surfaces of the inclined substructures 401a and the horizontal planes of the horizontal structures 401b corresponding to different incident angles are calculated.

Based on the above, when light is incident on the inclined substructure 401a of the wedge structure 401, according to the included angle $\theta$ which is the complementary angle of included angle between the inclined surface of the inclined substructure 401a and the horizontal plane of the horizontal structure 401b, incident light in a specific direction matched with the included angle $\theta$ will be modulated to be emerged from the horizontal substructure 401b at a smaller angle, thereby adjusting an angle of reflected light corresponding to the light of this angle to be closer to the central view angle. When light with different incident angles are respectively incident on corresponding inclined substructures 401a, the reflected light will all emerge at a smaller angle, thereby enhancing the optical characteristics of the central view angle.

When light is incident on the horizontal substructure 401b of the wedge structure 401, the emergent light will be emerged at an angle forming specular reflection with the incident light. When light of different angles are incident on the horizontal structure 401b of the wedge structure 401, reflected light are emerged at respective specular reflection angles, i.e., from all directions, thereby enhancing the view angle and achieving a display effect of wide view angle.

Figure 8:
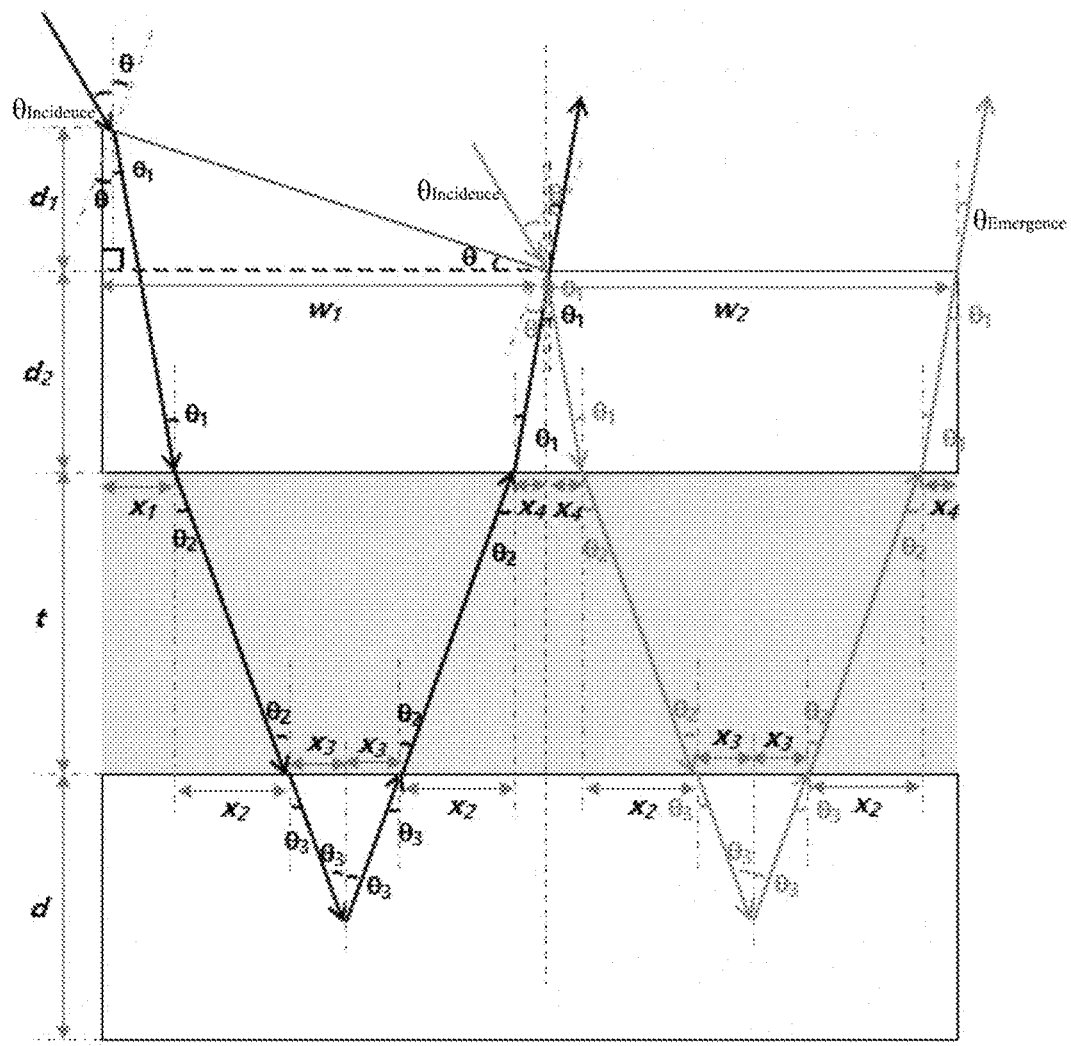
FIG. 8 is a schematic diagram of a light reflection principle of the display panel shown in FIG. 5.

In some embodiments, FIG. 8 is a schematic diagram of a light reflection principle of the display panel shown in FIG. 5. As shown in FIG. 8, dimensions of the inclined substructure 401a and the horizontal substructure 401b are set according to an angle of incident light, an angle of required emergent light, thicknesses of the second substrate and the liquid crystal layer, a width of a pixel area, and a quantity of wedge structures. The specific calculation process is as follows, $$n_{film}\sin\theta_1 = n_{substrate}\sin\theta_2 \Rightarrow \theta_2 =$$

$$\arcsin\left(\frac{n_{film}}{n_{substrate}}\sin\theta_1\right) \Rightarrow \theta_2 = \arcsin\left(\frac{n_{film}}{n_{substrate}}\sin\arcsin\left(\frac{1}{n_{film}}\sin\theta_{Emergence}\right)\right)$$

$$n_{substrate}\sin\theta_2 = n_{LC}\sin\theta_3 \Rightarrow \theta_3 = \arcsin\left(\frac{n_{substrate}}{n_{LC}}\sin\theta_2\right) \Rightarrow \theta_3 =$$

$$\arcsin\left[\frac{n_{substrate}}{n_{LC}}\sin\left[\arcsin\left(\frac{n_{film}}{n_{substrate}}\sin\arcsin\left(\frac{1}{n_{film}}\sin\theta_{Emergence}\right)\right)\right]\right]$$

$$w_1 = x_1 + 2x_2 + 2x_3 + x_4 = (d_1 + d_2)\tan\theta_1 + 2t\tan\theta_2 + d\tan\theta_3 + d_2\tan\theta_1$$

$$w_2 = 2x_2 + 2x_3 + 2x_4 = 2t\tan\theta_2 + d\tan\theta_3 + 2d_2\tan\theta_1$$

$$w_1 - w_2 = x_1 - x_4 = d_1\tan\theta_1 = w_1\tan\theta\tan\theta_1$$

$$w_1 + w_2 = \frac{P}{n}$$

$$w_1 = \frac{1}{2 - \tan\theta\tan\theta_1}\frac{P}{n}$$

$$w_2 = \left(1 - \frac{1}{2 - \tan\theta\tan\theta_1}\right)\frac{P}{n} = \left(1 - \frac{1}{2 - \tan\theta\tan\left[\arcsin\left(\frac{1}{n_{film}}\sin\theta_{Emergence}\right)\right]}\right)\frac{P}{n}$$

$$d_1 = w_1\tan\theta = \frac{\tan\theta}{2 - \tan\theta\tan\left[\arcsin\left(\frac{1}{n_{film}}\sin\theta_{Emergence}\right)\right]}\frac{P}{n}$$

$$d_2 = \frac{w_2 - 2t\tan\theta_2 - d\tan\theta_3}{2\tan\theta_1}$$

Among them, θ is the complementary angle of the included angle between the inclined surface of the inclined substructure and the horizontal plane of the horizontal structure, $w_1$ is a width of the inclined substructure, $w_2$ is a width of the horizontal substructure, $d_1$ is a height by which the inclined substructure is higher than the horizontal substructure, $d_2$ is a height of the horizontal substructure, $\theta_1$ is the included angle between the normal line of the display panel and the refracted light after the incident light passes through the inclined substructure, $\theta_2$ is the included angle between refracted incident light and the normal line of the display panel in the second substrate after the incident light is refracted by the wedge structure and the second substrate, $\theta_3$ is the included angle between refracted incident light and the normal line of the display panel in the liquid crystal layer after the incident light is refracted by the wedge structure, the second substrate, and the liquid crystal layer, P is a width of the pixel area, n is a quantity of wedge structures in each pixel area, t is a thickness of the second substrate, and d is a thickness of the liquid crystal layer.

In some embodiments, in a same wedge structure 401, incident light is incident from the inclined substructure 401a and emerged from the horizontal substructure 401b.

In practical application, sizes and angles of the inclined substructure 401a and the horizontal substructure 401b can be controlled, so that when the incident light is incident from the inclined substructure 401a, it can be emerged through the horizontal substructure 401b, a propagation direction of the light can be changed, an original propagation path of specular reflection can be broken, the emerged light can be adjusted to be within the range of the central view angle, and the utilization rate of the light can be improved.

In some embodiments, along a direction from an edge towards the center of the display panel, a complementary angle of the angle between the inclined surface of the inclined substructure 401a and the horizontal plane of the horizontal structure 401b gradually increases as the included angle between the incident light and the normal line of the display panel gradually decreases.

The complementary angle of the included angle between the inclined surface of the inclined substructure 401a and the horizontal plane of the horizontal structure 401b of each wedge structure 401 is different, and is set according to the incident angle of the incident light. For example, along the direction from the edge towards the center of the display panel, the complementary angle of the included angle between the inclined surface of the inclined substructure 401a and the horizontal plane of the horizontal structure 401b gradually increases as the included angle between the incident light and the normal line of the display panel gradually decreases, so that the incident light can be more uniformly reflected to the central view angle and the display effect of the display panel is improved.

In some embodiments, the inclined substructure 401a has a first boundary and a second boundary that are sequentially disposed in the direction of incident light, and the horizontal substructure 401b has a third boundary and a fourth boundary that are sequentially disposed in the direction of emergent light. Incident light incident from the first boundary is emerged at the third boundary, and incident light incident from the second boundary is emerged at the fourth boundary.

The incident light incident from the first boundary is emerged at the third boundary; the incident light incident from the second boundary is emerged at the fourth boundary, so that all light incident from the inclined substructure 401a are emerged from the horizontal substructure 401b, thereby improving the utilization rate of light.

In some embodiments, the degree of included angle between the different emergent light passing through the inclined substructure 401a and the horizontal substructure 401b and the normal line of the display panel is less than a target value. Light with different angles are incident from the inclined surface of the inclined substructure 401a, reflected back to the second substrate 20 after passing through the second substrate 20 and the liquid crystal layer 30, and emerged from the horizontal plane of the horizontal substructure 401b. By setting sizes and angles of the different inclined substructures 401a, the emerged light have similar emergent angles which are all less than a certain target value, for example, less than 5 degrees, thus ensuring that most of the light can enter the central view angle of the user, thereby improving the optical effect of the central view angle and improving the use experience of the user. Optionally, light of different angles are emerged from the horizontal substructure 401b at the same emergent angles.

In some embodiments, incident light incident from the horizontal substructure 401b is emerged at an emergent angle of specular reflection.

When light is incident on the horizontal substructure 401b of the wedge structure 401, the emergent light will be emerged at an angle forming specular reflection with the incident light. When light of different angles are incident on the horizontal structure 401b of the wedge structure 401, reflected light are emitted at respective specular reflection angles, i.e., from all directions, thereby enhancing the view angle and achieving the display effect of wide view angle.

In some embodiments, in a same pixel area, a quantity of inclined substructures 401a and a quantity of the horizontal substructures 401b are the same and are integer number.

In practical application, the inclined substructure 401a and the horizontal substructure 401b are disposed in pairs, which ensures that the light incident from the inclined substructure 401a are all emerged from the horizontal substructure 401b, and the quantity of inclined substructures 401a and the quantity of horizontal substructures 401b are both integers, which ensures that light of a same color are emerged in their respective pixel areas, avoids crosstalk between adjacent light of different colors, and improves the display effect.

Figure 9:
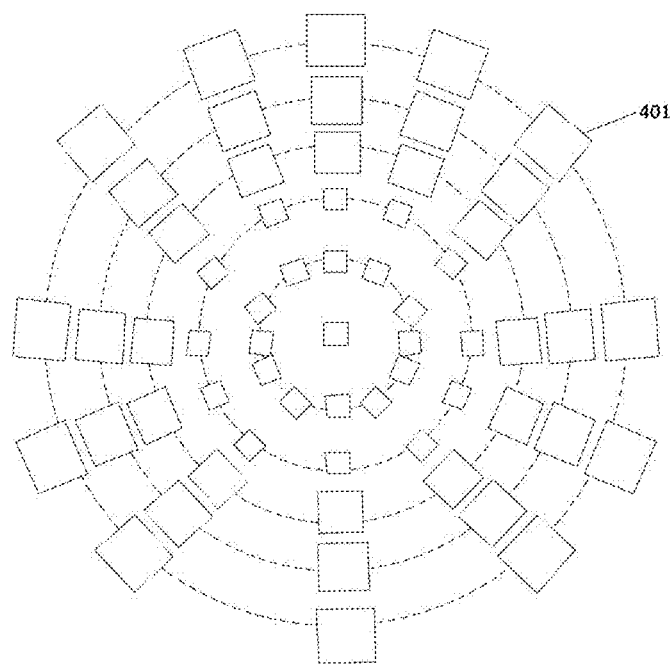
FIG. 9 is a schematic top view of a structure of the display panel shown in FIG. 5.

FIG. 9 is a schematic top view of a structure of the display panel shown in FIG. 5. As shown in FIG. 9, the wedge structures 401 are arranged in concentric circles with a center of the display panel being their center.

With the center of the display panel being the center, each wedge structure 401 can be arranged in concentric circles, which can make the whole display panel achieve a more uniform optical effect and improve the user experience.

In some embodiments, a difference between any two of refractive indices of the microstructure optical film layer 40, the second substrate 20, and the liquid crystal layer 30 is less than a preset value.

Since the refractive indices of the microstructure optical film layer 40, the second substrate 20, and the liquid crystal layer 30 are similar, total reflection caused by the refractive index differences between film layers can be avoided in a process of light propagation, which affects the utilization rate of light. For example, the difference between any two of the refractive indices of the microstructure optical film layer 40, the second substrate 20, and the liquid crystal layer 30 is less than 0.2, which ensures that a refractive effect of the light has little influence on a propagation direction of the light when the light pass through the adjacent two film layers, and ensures that the light enter the central view angle in an expected direction. It can be understood that the smaller the difference between the refractive indices of the microstructure optical film layer 40, the second substrate 20, and the liquid crystal layer 30, the smaller the influence on the propagation direction of light. Optionally, The refractive indices of the microstructure optical film layer 40, the second substrate 20, and the liquid crystal layer 30 are all equal.

In some embodiments, as shown in FIG. 1 and FIG. 5, the first substrate 10 includes a first base substrate 101, multiple pixel electrodes 102, a drive circuit layer 103, and a first alignment layer 104. The multiple pixel electrodes 102 are located on the first base substrate 101. The drive circuit layer 103 is located on a side of the pixel electrodes 102 close to the first base substrate 101. The first alignment layer 104 is located on a side of the pixel electrode 102 facing away from the first base substrate 101.

The multiple pixel electrodes 102 are located on the first base substrate 101, and different pixel electrodes can drive the cholesteric liquid crystals in different pixel areas respectively. By applying different voltages, the cholesteric liquid crystals in different pixel areas respectively reflect light of different colors, thus achieving color display. When white display is implemented, different voltages can be applied to pixel electrodes 102 in three adjacent pixel areas to achieve reflection of red, green, and blue light, and light of different colors have been mixed to form white light.

The drive circuit layer 103 may be composed of multiple pixel drive circuits, and the pixel drive circuits may be formed in conventional configurations such as 2T1C, 3T1C, and 5T2C in the related art, which will not be listed herein. Pixel drive voltages may be supplied to each pixel electrode 102 through the drive circuit layer 103 to drive the cholesteric liquid crystal in the liquid crystal layer 30 to deflect thereby achieving a color display function.

Figure 10A:
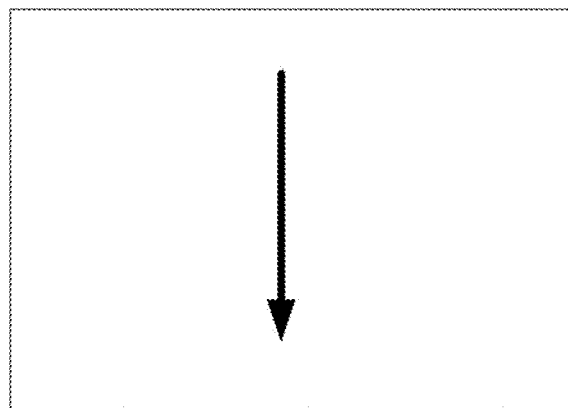
FIG. 10a is a schematic diagram of a first alignment layer in a display panel according to an embodiment of the present disclosure.

The first alignment layer 104 may have a fixed alignment direction, and the alignment direction of the first alignment layer 104 may be as shown in FIG. 10a, so that the cholesteric liquid crystal can be fixed along the alignment direction in the initial state, thereby ensuring a regular arrangement of the cholesteric liquid crystal and avoiding problems such as light leakage.

In some embodiments, as shown in FIG. 1 and FIG. 5, the second substrate 20 includes a second base substrate 201, a common electrode layer 202, and a second alignment layer 203. The common electrode layer 202 is located on a side of the second base substrate 201 close to the first base substrate 101. The second alignment layer 203 is located on a side of the common electrode layer 202 facing away from the second base substrate 201.

An electric field may be formed between the common electrode 202 and the pixel electrodes 102 to drive the cholesteric liquid crystal in the liquid crystal layer 30 to deflect, thereby achieving a color display function.

Figure 10B:
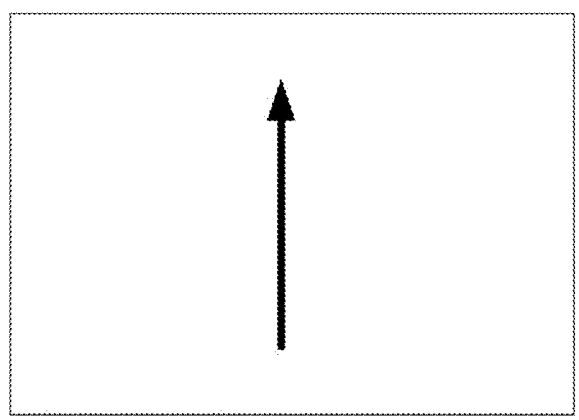
FIG. 10b is a schematic diagram of a second alignment layer in a display panel according to an embodiment of the present disclosure.

The second alignment layer 203 may have a fixed alignment direction, and the alignment direction of second alignment layer 203 may be as shown in FIG. 10b, so that the cholesteric liquid crystal can be fixed in an initial state along the alignment direction, thus ensuring a regular arrangement of the cholesteric liquid crystal and avoiding problems such as light leakage. Specifically, an alignment direction of the first alignment layer 104 and an alignment direction the second alignment layer 203 are inversely parallel.

In some embodiments, as shown in FIG. 1 and FIG. 5, the display panel further includes supports 204 between the first alignment layer 104 and the second alignment layer 203. cholesteric liquid crystal is filled between adjacent supports 204.

The supports 204 may support the integrated first substrate 10 and second substrate 20 to form a liquid crystal cell to maintain a cell thickness of the liquid crystal cell so that the cholesteric liquid crystal is filled between adjacent supports 204, i.e., the cholesteric liquid crystal is filled in the formed liquid crystal cells.

In a second aspect, an embodiment of the present disclosure provides a display device, which includes the display panel as provided in any of the aforementioned embodiments. The display device may be an electronic device with a display function such as a tablet computer, a computer display, a laptop computer, etc. The specific realization principle and beneficial effect of the display device are the same as those of the display panel provided above, which will not be described here.

It is to be understood that the above embodiments are only exemplary embodiments employed for the purpose of illustrating the principles of the present disclosure, however the present disclosure is not limited thereto. To those of ordinary skills in the art, various modifications and improvements may be made without departing from the spirit and substance of the present disclosure, and these modifications and improvements are also considered to be within the scope of the present disclosure.

The invention claimed is:

1. A display panel, comprising: a first substrate and a second substrate disposed oppositely and a liquid crystal layer disposed between the first substrate and the second substrate; a material of the liquid crystal layer comprises cholesteric liquid crystal; the display panel further comprises a microstructure optical film layer located on a side of the second substrate facing away from the first substrate; incident light is incident from a side of the microstructure optical film layer, reflected by the cholesteric liquid crystal, and then emerged from the microstructure optical film layer; and the microstructure optical film layer comprises a plurality of wedge structures; at least part of the wedge structures have different angles and sizes, so that light emerged from side view angles and with different emergent angles are adjusted to be emerged from a center view angle;

wherein each wedge structure comprises: an inclined substructure and a horizontal substructure; an included angle between an inclined surface of the inclined substructure and a horizontal plane of the horizontal substructure is greater than 90 degrees and less than 180 degrees;

wherein $$\theta = \arctan\left[\frac{\sin\theta_{Incidence} - n_{film}\sin\left(\arcsin\left(\frac{1}{n_{film}}\sin\theta_{Emergence}\right)\right)}{n_{film}\cos\left(\arcsin\left(\frac{1}{n_{film}}\sin\theta_{Emergence}\right)\right) - \cos\theta_{Incidence}}\right]$$

θ is a complementary angle of the included angle between the inclined surface of the inclined substructure and the horizontal plane of the horizontal structure, $\theta_{Incidence}$ is an included angle between the incident light and a normal line of the display panel, $\theta_{Emergence}$ is an included angle between emergent light and the normal line of the display panel, $n_{film}$ is a refractive index of the wedge structure.

2. The display panel according to claim 1, wherein $$w_1 = \frac{1}{2 - \tan\theta\tan\theta_1}\frac{P}{n}$$

$$w_2 - \left(1 - \frac{1}{2 - \tan\theta\tan\theta_1}\right)\frac{P}{n} = \left(1 - \frac{1}{2 - \tan\theta\tan\left[\arcsin\left(\frac{1}{n_{film}}\sin\theta_{Emergence}\right)\right]}\right)\frac{P}{n}$$

$$d_1 = w_1\tan\theta$$

$$d_2 = \frac{w_2 - 2t\tan\theta_2 - d\tan\theta_3}{2\tan\theta_1}$$

$w_1$ is a width of the inclined substructure, $w_2$ is a width of the horizontal substructure, $d_1$ is a height by which the inclined substructure is higher than the horizontal substructure, $d_2$ is a height of the horizontal substructure, $\theta_1$ is an included angle between the normal line of the display panel and refracted light after the incident light passes through the inclined substructure, $\theta_2$ is an included angle between refracted light and the normal line of the display panel in the second substrate after the incident light is refracted by the wedge structure and the second substrate, $\theta_3$ is an included angle between refracted light and the normal line of the display panel in the liquid crystal layer after the incident light is refracted by the wedge structure, the second substrate, and the liquid crystal layer, P is a width of a pixel area, n is a number of wedge structures in each pixel area, t is a thickness of the second substrate, and d is a thickness of the liquid crystal layer.

3. The display panel according to claim 2, wherein in a same wedge structure, the incident light is incident from the inclined substructure and emerged from the horizontal substructure.

4. The display panel according to claim 2, wherein the complementary angle of the included angle between the inclined surface of the inclined substructure and the horizontal plane of the horizontal structure gradually increases as an included angle between the incident light and the normal line of the display panel gradually decreases in a direction from an edge of the display panel toward a center of the display panel.

5. The display panel according to claim 2, wherein in a same pixel area, a quantity of the inclined substructures is the same as a quantity of the horizontal substructures and both are integer numbers.

6. The display panel according to claim 1, wherein all of the wedge structures are arranged in concentric circles centered on a center of the display panel.

7. The display panel according to claim 1, wherein a difference between refractive indices of any two of the microstructure optical film layer, the second substrate, and the liquid crystal layer is smaller than a preset value.

8. The display panel according to claim 1, wherein the first substrate comprises: a first base substrate, a plurality of pixel electrodes, a drive circuit layer, and a first alignment layer;

the plurality of pixel electrodes are located on the first base substrate;

the drive circuit layer is located on a side of the pixel electrodes close to the first base substrate; and the first alignment layer is located on a side of the pixel electrodes facing away from the first base substrate.

9. The display panel according to claim 8, wherein the second substrate comprises: a second base substrate, a common electrode layer, and a second alignment layer;

the common electrode layer is located on a side of the second base substrate close to the first base substrate; and the second alignment layer is located on a side of the common electrode layer facing away from the second base substrate.

10. The display panel according to claim 9, wherein an alignment direction of the first alignment layer and an alignment direction of the second alignment layer are inversely parallel to each other.

11. The display panel according to claim 9, further comprising: supports between the first alignment layer and the second alignment layer; and cholesteric liquid crystal is filled between adjacent supports.

12. A display device, comprising: the display panel of claim 1.

13. The display device according to claim 12, wherein $$w_1 = \frac{1}{2 - \tan\theta\tan\theta_1}\frac{P}{n}$$

-continued $$w_2 - \left(1 - \frac{1}{2 - \tan\theta\tan\theta_1}\right)\frac{P}{n} = \left(1 - \frac{1}{2 - \tan\theta\tan\left[\arcsin\left(\frac{1}{n_{film}}\sin\theta_{Emergence}\right)\right]}\right)\frac{P}{n}$$

$$d_1 = w_1 \tan\theta$$

$$d_2 = \frac{w_2 - 2t\tan\theta_2 - d\tan\theta_3}{2\tan\theta_1}$$

$w_1$ is a width of the inclined substructure, $w_2$ is a width of the horizontal substructure, $d_1$ is a height by which the inclined substructure is higher than the horizontal substructure, $d_2$ is a height of the horizontal substructure, $\theta_1$ is an included angle between the normal line of the display panel and refracted light after the incident light passes through the inclined substructure, $\theta_2$ is an included angle between refracted light and the normal line of the display panel in the second substrate after the incident light is refracted by the wedge structure and the second substrate, $\theta_3$ is an included angle between refracted light and the normal line of the display panel in the liquid crystal layer after the incident light is refracted by the wedge structure, the second substrate, and the liquid crystal layer, P is a width of a pixel area, n is a number of wedge structures in each pixel area, t is a thickness of the second substrate, and d is a thickness of the liquid crystal layer.

14. The display device according to claim 13, wherein in a same wedge structure, the incident light is incident from the inclined substructure and emerged from the horizontal substructure.

15. The display device according to claim 13, wherein the complementary angle of the included angle between the inclined surface of the inclined substructure and the horizontal plane of the horizontal structure gradually increases as an included angle between the incident light and the normal line of the display panel gradually decreases in a direction from an edge of the display panel toward a center of the display panel.

16. The display device according to claim 13, wherein in a same pixel area, a quantity of the inclined substructures is the same as a quantity of the horizontal substructures and both are integer numbers.

* * * * *